US012684369B2

(12) United States Patent
Yildiz et al.

(10) Patent No.: US 12,684,369 B2
(45) Date of Patent: Jul. 14, 2026

(54) INCREASING SECRECY CAPACITY FOR INTELLIGENT REFLECTIVE SURFACE-ASSISTED WIRELESS COMMUNICATIONS

(71) Applicant: Dell Products L.P., Round Rock, TX (US)

(72) Inventors: Ozlem Yildiz, New York, NY (US); Mohammad Alavirad, Kanata (CA); Tejinder Singh, Kanata (CA)

(73) Assignee: DELL PRODUCTS L.P., Round Rock, TX (US)

( * ) Notice: Subject to any disclaimer, the term of this patent is extended or adjusted under 35 U.S.C. 154(b) by 371 days.

(21) Appl. No.: 18/469,724

(22) Filed: Sep. 19, 2023

(65) Prior Publication Data

US 2024/0098516 A1 Mar. 21, 2024

Related U.S. Application Data

(60) Provisional application No. 63/408,666, filed on Sep. 21, 2022.

(51) Int. Cl.
*H04W 16/20* (2009.01)
*H04B 7/04* (2017.01)

(52) U.S. Cl.
CPC ........ *H04W 16/20* (2013.01); *H04B 7/04013* (2023.05)

(58) Field of Classification Search
CPC ........................... H04B 7/04013; H04W 16/20
USPC ....................................................... 370/329
See application file for complete search history.

(56) References Cited

U.S. PATENT DOCUMENTS

| | | | | |
|---|---|---|---|---|
| 10,375,762 | B2 * | 8/2019 | Lu ......................... | H04W 36/06 |
| 12,063,514 | B2 * | 8/2024 | Balasubramanian .... | H04K 3/68 |
| 12,273,963 | B2 * | 4/2025 | Horn ..................... | H04W 88/04 |
| 2021/0288698 | A1 * | 9/2021 | Chen ................... | H04B 7/0617 |
| 2023/0187808 | A1 * | 6/2023 | Jian ..................... | H01Q 1/1257 |
| | | | | 370/328 |

(Continued)

OTHER PUBLICATIONS

J. Bai, H. -M. Wang and P. Liu, "Robust IRS-Aided Secrecy Transmission With Location Optimization," in IEEE Transactions on Communications, vol. 70, No. 9, pp. 6149-6163, Sep. 2022, DOP Jul. 25, 2022 (Year: 2022).*

(Continued)

*Primary Examiner* — Robert J Lopata
(74) *Attorney, Agent, or Firm* — Amin, Turocy & Watson, LLP

(57) ABSTRACT

The technology described herein is directed towards increasing the secrecy capacity/performance of an intelligent reflective surface (IRS)-assisted communication system. Described is determining a location for placement of the IRS to achieve the maximum secrecy capacity with respect to a receiver in an environment. Gradient descent along with ray tracing, facilitates determination of the optimal placement, which can be used along with an alignment strategy of tile-allocation and phase-shift adjustment for the IRS to optimize the secrecy capacity within constraints. When implemented at the determined location, IRS-assisted communications result in significant improvement of the secrecy capacity performance for an (e.g., indoor) media communication network.

20 Claims, 12 Drawing Sheets

(56) References Cited

U.S. PATENT DOCUMENTS

| | | | |
|---|---|---|---|
| 2023/0268650 A1* | 8/2023 | Swartz | H04B 7/043 |
| | | | 455/411 |
| 2024/0413858 A1* | 12/2024 | Mcmenamy | H04W 24/10 |
| 2024/0413879 A1* | 12/2024 | Dai | H04B 7/04013 |
| 2025/0048110 A1* | 2/2025 | Alayasra | H04B 7/0617 |

OTHER PUBLICATIONS

Yildiz, et al., "Investigation and Optimization of Secrecy Capacity for Intelligent Reflective Surfaces-Assisted Secure mm Wave Indoor Wireless Communication," 2023 IEEE Radio and Invention Disclosure Jul. 4, 2023, Wireless Symposium (RWS), Las Vegas, NV, USA, 2023, pp. 1-3, doi: 10.1109/RWS55624.2023.10046340.

mathworks.com, "RayTracing," https://www.mathworks.com/help/antenna/ref/rfprop.raytracing.html, Retrieved from the Internet: Aug. 28, 2023.

mathworks.com, "rxsite," https://www.mathworks.com/help/antenna/ref/rxsite.html, Retrieved from the Internet: Aug. 28, 2023.

mathworks.com, "txsite," https://www.mathworks.com/help/antenna/ref/txsite.html, Retrieved from the Internet: Aug. 28, 2023.

github.com, "sdrangan/mmwComm," https://github.com/sdrangan/mmwComm/tree/master/%2Bmmwsim/%2Bchan, Retrieved from the Internet: Aug. 28, 2023.

Di Renzo, et al., "Smart Radio Environments Empowered by Reconfigurable Intelligent Surfaces: How it Works, State of Research, and Road Ahead," IEEE J. Sel. Areas Commun., vol. 38, No. 11, pp. 2450-2525, Date of Publication: Jul. 14, 2020.

Di, et al., "Hybrid Beamforming for Reconfigurable Intelligent Surface based Multi-User Communications: Achievable Rates With Limited Discrete Phase Shifts," IEEE J. Sel. Areas Commun., vol. 38, No. 8, pp. 1809-1822, Date of Publication: Jun. 8, 2020.

You, et al., "Enabling Smart Reflection in Integrated Air-Ground Wireless Network: IRS Meets UAV," IEEE Trans. Wireless Commun., vol. 28, No. 6, pp. 138-144, Date of Publication: Dec. 2021.

Huang, et al., "Reconfigurable Intelligent Surfaces for Energy Efficiency in Wireless Communication," IEEE Trans. Wireless Commun., vol. 18, No. 8, pp. 4157-4170, Date of Publication: Jun. 19, 2019.

Yu, et al., "Enabling Secure Wireless Communications via Intelligent Reflecting Surfaces," in 2019 IEEE Global Commu. Conf. (GLOBECOM), Date of Conference: Dec. 9-13, 2019, pp. 1-6.

Yuan, et al., "Reconfigurable-Intelligent-Surface Empowered Wireless Communications: Challenges and Opportunities," IEEE Wireless Commun., vol. 28, No. 2, pp. 136-143, Date of Publication: Feb. 22, 2021.

Liu, et al., "Secrecy rate analysis for reconfigurable intelligent surface-assisted mimo communications with statistical CSI," China Communications, vol. 18, No. 3, pp. 52-62, Date of Publication: Mar. 23, 2021.

Issa, et al., "Using Reflective Intelligent Surfaces for Indoor Scenarios: Channel Modeling and RIS Placement," in Proc. 17th Intl. Conf. Wireless and Mobile Comput., Networking and Commun. (WiMob), Date of Conference: Oct. 11-13, 2021, pp. 277-282.

* cited by examiner

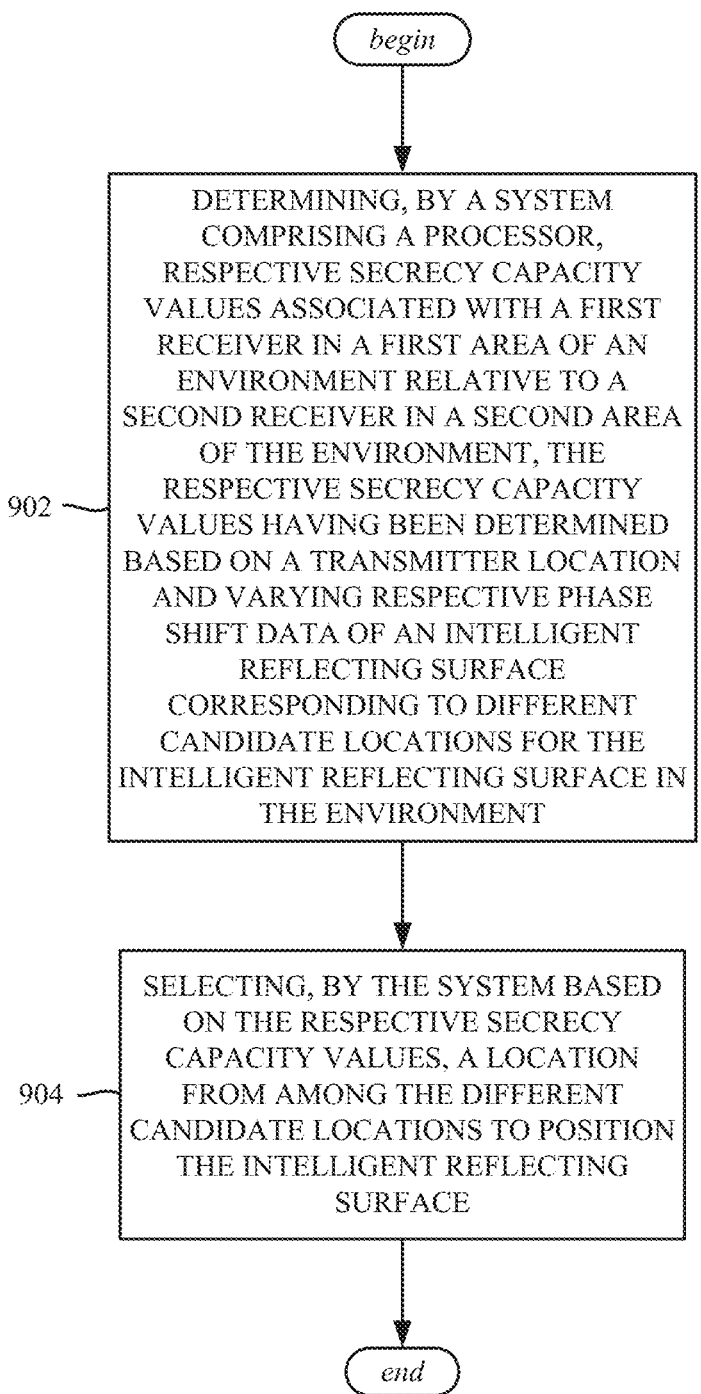

begin

902 — DETERMINING, BY A SYSTEM COMPRISING A PROCESSOR, RESPECTIVE SECRECY CAPACITY VALUES ASSOCIATED WITH A FIRST RECEIVER IN A FIRST AREA OF AN ENVIRONMENT RELATIVE TO A SECOND RECEIVER IN A SECOND AREA OF THE ENVIRONMENT, THE RESPECTIVE SECRECY CAPACITY VALUES HAVING BEEN DETERMINED BASED ON A TRANSMITTER LOCATION AND VARYING RESPECTIVE PHASE SHIFT DATA OF AN INTELLIGENT REFLECTING SURFACE CORRESPONDING TO DIFFERENT CANDIDATE LOCATIONS FOR THE INTELLIGENT REFLECTING SURFACE IN THE ENVIRONMENT

904 — SELECTING, BY THE SYSTEM BASED ON THE RESPECTIVE SECRECY CAPACITY VALUES, A LOCATION FROM AMONG THE DIFFERENT CANDIDATE LOCATIONS TO POSITION THE INTELLIGENT REFLECTING SURFACE end

FIG. 9

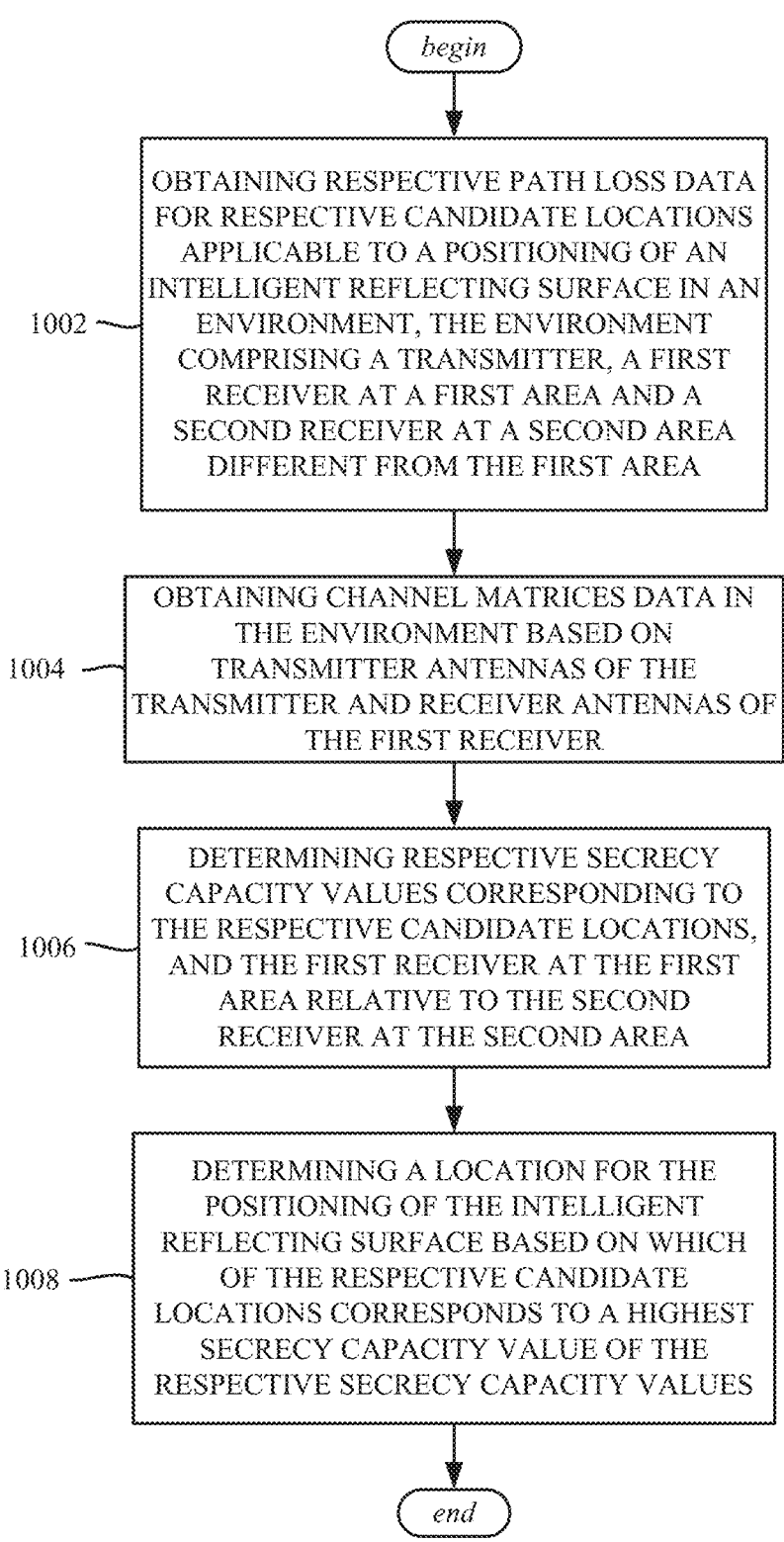

begin

1002 — OBTAINING RESPECTIVE PATH LOSS DATA FOR RESPECTIVE CANDIDATE LOCATIONS APPLICABLE TO A POSITIONING OF AN INTELLIGENT REFLECTING SURFACE IN AN ENVIRONMENT, THE ENVIRONMENT COMPRISING A TRANSMITTER, A FIRST RECEIVER AT A FIRST AREA AND A SECOND RECEIVER AT A SECOND AREA DIFFERENT FROM THE FIRST AREA

1004 — OBTAINING CHANNEL MATRICES DATA IN THE ENVIRONMENT BASED ON TRANSMITTER ANTENNAS OF THE TRANSMITTER AND RECEIVER ANTENNAS OF THE FIRST RECEIVER

1006 — DETERMINING RESPECTIVE SECRECY CAPACITY VALUES CORRESPONDING TO THE RESPECTIVE CANDIDATE LOCATIONS, AND THE FIRST RECEIVER AT THE FIRST AREA RELATIVE TO THE SECOND RECEIVER AT THE SECOND AREA

1008 — DETERMINING A LOCATION FOR THE POSITIONING OF THE INTELLIGENT REFLECTING SURFACE BASED ON WHICH OF THE RESPECTIVE CANDIDATE LOCATIONS CORRESPONDS TO A HIGHEST SECRECY CAPACITY VALUE OF THE RESPECTIVE SECRECY CAPACITY VALUES end

FIG. 10

INCREASING SECRECY CAPACITY FOR INTELLIGENT REFLECTIVE SURFACE-ASSISTED WIRELESS COMMUNICATIONS

RELATED APPLICATION

This application is a non-provisional of, and claims priority to, U.S. provisional patent application Ser. No. 63/408,666 filed Sep. 21, 2022, entitled "Secrecy Capacity Optimization for Intelligent Reflective Surfaces-Assisted Secure mmWave Indoor Wireless Communication". The entirety of the aforementioned application is hereby incorporated herein by reference.

BACKGROUND

Millimeter wave (mmWave) band communication is envisioned as an emerging wireless technology to fulfill high data rate transmission and high data security for beyond 5G (B5G) and next generation 6G communications. However, the higher frequency bands and narrow beams of mmWave technology are susceptible to blockage and excessive signal propagation loss.

Designing non-line-of-sight (nLoS) communication links with smart reflector arrays can get around blockage and reduce signal propagation loss. To this end, intelligent reflecting surfaces (IRSs, sometimes referred to as "reconfigurable intelligent surfaces" or "reflective intelligent surfaces", RISs) are a promising technology that can smartly reconfigure a wireless environment to enhance the performance of future wireless systems.

While IRSs are a promising technology for future wireless communication systems, their deployment has many challenges. One such challenge is that because an IRS generally improves the communication performance in a given environment, the redirected communication signals also can be exploited by eavesdroppers who can intercept the signals and decode them.

BRIEF DESCRIPTION OF THE DRAWINGS

The technology described herein is illustrated by way of example and not limited in the accompanying figures in which like reference numerals indicate similar elements and in which:

FIG. 9 is a flow diagram showing example operations related to selecting a location from among different candidate locations to position an intelligent reflecting surface based on secrecy capacity with respect to a receiver, in accordance with various aspects and implementations of the subject disclosure.

FIG. 10 is a flow diagram showing example operations related to determining secrecy capacity values for intelligent reflecting surface candidate locations and determining a location for positioning the intelligent reflecting surface based on the highest secrecy capacity value, in accordance with various aspects and implementations of the subject disclosure.

DETAILED DESCRIPTION

Figure 1:
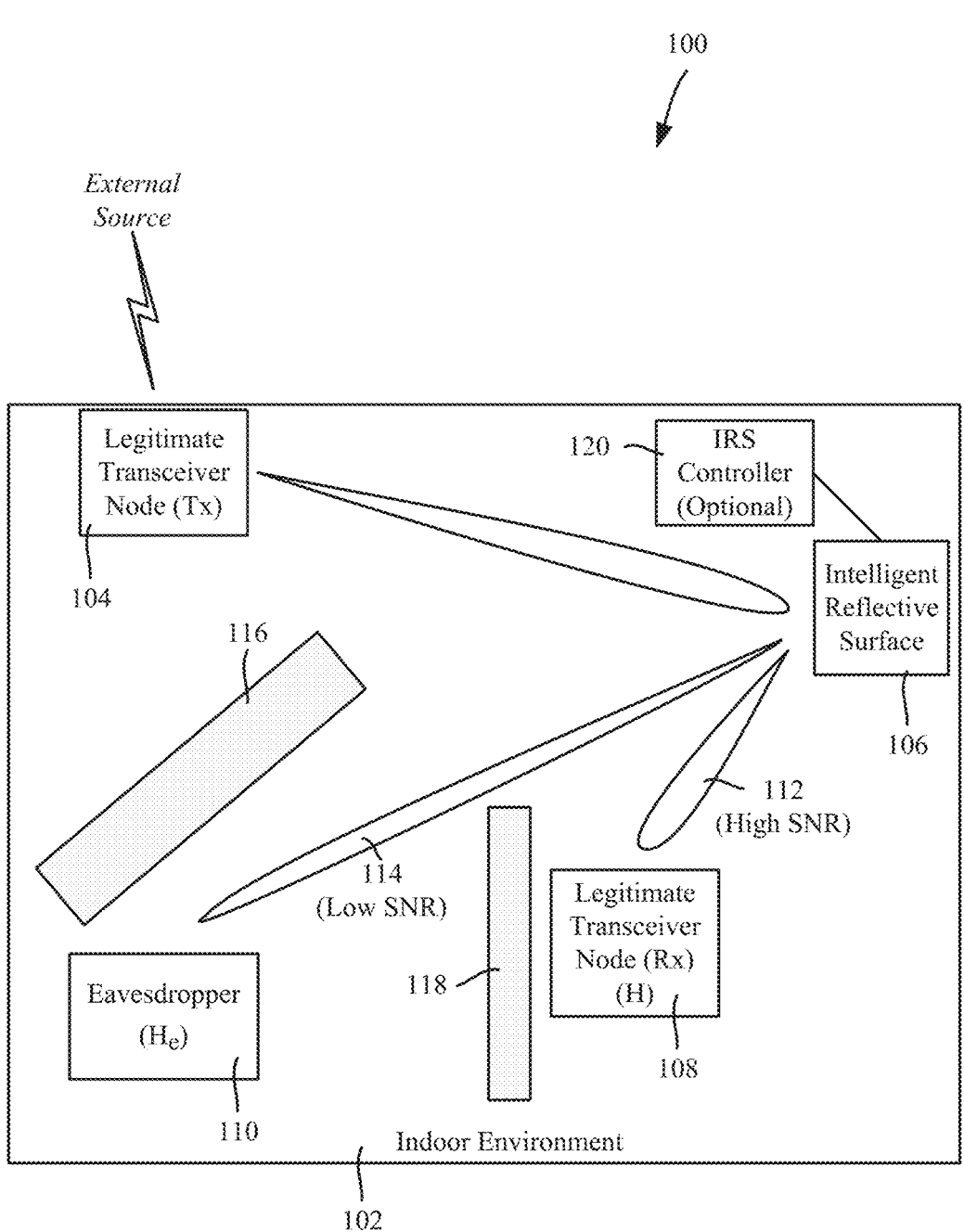
FIG. 1 is a two-dimensional representation of an environment in which an intelligent reflecting surface is located to redirect communication signals from a transmitter to receivers, in accordance with various aspects and implementations of the subject disclosure.

The technology described herein is generally directed to placement of an intelligent reflective surface in an environment to increase secrecy capacity of a legitimate receiver in one area of the environment relative to an eavesdropper receiver in another area. Secrecy capacity is a physical layer security performance metric, and refers to the highest rate of information that can be confidentially communicated between a legitimate transmitter and legitimate receiver when one or more eavesdroppers may be present. In general, physical layer security is based on enhancing the signal-to-noise ratio (SNR) at the legitimate receiver while significantly reducing the SNR at the eavesdropper location.

In one implementation, the transmitter is equipped with multiple antennas, and communicates with one legitimate receiver, presumably in the presence of an eavesdropper, when the environment includes an intelligent reflective surface as a beamforming media. Under a discrete phase-shift consideration, techniques for leveraging a joint optimization problem of transmitter (Tx) beamforming, receiver (Rx) beamforming, and IRS phase shifter matrix are formulated to determine a location (from among various possible candidate locations) for installing the intelligent reflective surface that maximizes the secrecy capacity when beamforming of the legitimate receiver and eavesdropper is generally fixed.

In addition to determining the optimal placement to achieve the maximum secrecy capacity, also described is a tile-allocation-and-phase-shift-adjustment strategy for the IRS to optimize the secrecy capacity. A projected gradient descent method is leveraged to address the optimization problem associated with secrecy capacity, e.g., when both the user and base station maintain fixed positions. The optimization process effectively enforces the prescribed requirements and determines the optimal solution for the beamforming vectors. This approach facilitates deploying machine learning solutions to tackle such complex problems, thereby mitigating the need for rigorous problem-solving when system configurations change.

Further, a ray-tracing environment is utilized to model the path-loss experienced by both the line-of-sight and reflection paths. This framework enables a more tailored placement of intelligent reflecting surfaces (IRS) to accommodate diverse room designs and materials encountered.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

It also should be noted that terms used herein, such as "optimize," "optimization," "optimal" and the like only represent objectives to move towards a more optimal state, rather than necessarily obtaining ideal results. Similarly, "maximize" means moving towards a maximal state, not necessarily achieving such a state, as does "minimize" (moving towards a minimal state) and the like. As one example, "maximizing" the secrecy capacity refers to choosing the highest secrecy capacity value that can be selected from those obtained based on possible candidate locations of an intelligent reflective surface, not necessarily the highest secrecy capacity value that can be achieved by other techniques and/or from among locations that are impractical. Similarly, "optimizing" refers to processing limited, discrete variable data that converges to an acceptable point, not necessarily any true optimum point.

Embodiments of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein. As one example, the optimal location of an intelligent reflective surface within an indoor environment is described; however, the technology described herein is not limited to indoor environments.

FIG. 1 illustrates a system 100 in which an indoor environment (scenario) 102 includes an indoor (legitimate) transceiver node 104 (denoted G in the equations herein) that provides signals to and from an external (e.g., outdoor) source to and from an intelligent reflective surface 106. The intelligent reflective surface 106 provides radio communications/radio coverage between the indoor transceiver 104 via line-of-sight (LoS), and (via reflection) to otherwise non-line-of-sight (nLoS) user equipment (UEs).

In the example of FIG. 1, the non-line-of-sight UEs include another legitimate transceiver node 108 (shown as a receiver Rx), and an unauthenticated eavesdropper node 110. When the transceiver 104 is operating as a transmitter (Tx), the intelligent reflective surface 106 redirects the transmitted signals 112 and 114 to avoid the obstacles 116 and 118 (e.g., walls, bookshelves and so on) and thereby reach the otherwise non-line-of-sight receiving UE nodes, including the legitimate node 108 acting as a receiver (Rx). Redirection in the opposite path is also achieved, e.g., when the legitimate transceiver node 108 is transmitting and the transceiver node 104 is receiving. Note that redirection is generally by reflection, including in the examples herein, but redirection by refraction is possible.

As described herein, the location as to where the intelligent reflective surface 106 is positioned (e.g., wall-mounted) in the environment is significant with respect to the security capacity of a UE, in this example to increase the security capacity of the legitimate node 108 when considered relative to the eavesdropper 110. More particularly, an intelligent reflective surface has multiple reflecting elements with phase shift angles that correspond to the beamforming vectors between the transceiver node (at a fixed location in this example) and any of the various locations in the environment. The beamforming vectors (and correspondingly the SNRs of the receivers) thus change with the location of the intelligent reflective surface 106.

In general, intelligent reflecting surfaces are specifically designed manmade surfaces of artificially engineered materials fabricated using a stack of metal and dielectric layers. These thin two-dimensional metasurfaces (e.g., reflecting elements) can be set to tune an electromagnetic wave's key properties, such as amplitude, phase, and polarization, as the electromagnetic wave is reflected or refracted by the surface. In other words, a reconfigurable intelligent surface is a two-dimensional surface whose surface can be electronically altered such that it changes the characteristics of any incoming electromagnetic wave, including the wave's phase.

In some scenarios, an intelligent reflecting surface is static with respect to its ability to change electromagnetic wave characteristics such as amplitude, phase, and/or polarization. In such a static scenario, the reflecting elements can be statically set and/or have their characteristics determined once, such as prior to deployment of an intelligent reflecting surface. In other scenarios, a controller 120 can dynamically change the IRS's reflecting (or refracting) elements, such as to perform more precise beamforming in dynamic environments, e.g., between one or more mobile communication nodes and/or if mobile obstacles occasionally block one signal path and another, unblocked signal path can be selected. In an IRS-assisted secure system, the IRS can intelligently adjust its phase shifts to guide signal power to a given receiver and minimize information leakage. For example, a dynamically reconfigurable IRS is able to significantly enhance physical layer security by controlling its reconfigurable reflecting elements to add wireless signals constructively at a legitimate receiver, but destructively at a potential eavesdropper.

As will be understood, the technology described herein provides benefits with both static intelligent reflecting surfaces and dynamically configurable intelligent reflecting surfaces. Indeed, an intelligent reflective surface can enhance the physical layer security in a communication link by using passive beamforming, as physical layer security is directly correlated with directing the user's communication link into a desired direction. An IRS can be positioned to maximize the secrecy capacity and the first physical layer security PLS performance metric, by optimizing the phase shift of IRS and beamforming vector of the transmitter. Thus, the IRS controller 120 is shown as optional in FIG. 1, depending on the type of intelligent reflecting surface in use in a given environment.

As described herein, the location at which the intelligent reflective surface is to be fixed in the environment can be determined (e.g., when designing or retrofitting to a room) so as to provide high security capacity with respect to a legitimate receiver in one area, thereby preventing an eavesdropper in another area from receiving signals sufficient for decoding. Note that an area can be as small as a point location, but alternatively a receiver area can be based on a few likely receiver locations, with the location of the intelligent reflective surface chosen such that the security capacity is based on a combination (e.g., average) of estimates relative to those likely receiver locations.

Figure 2:
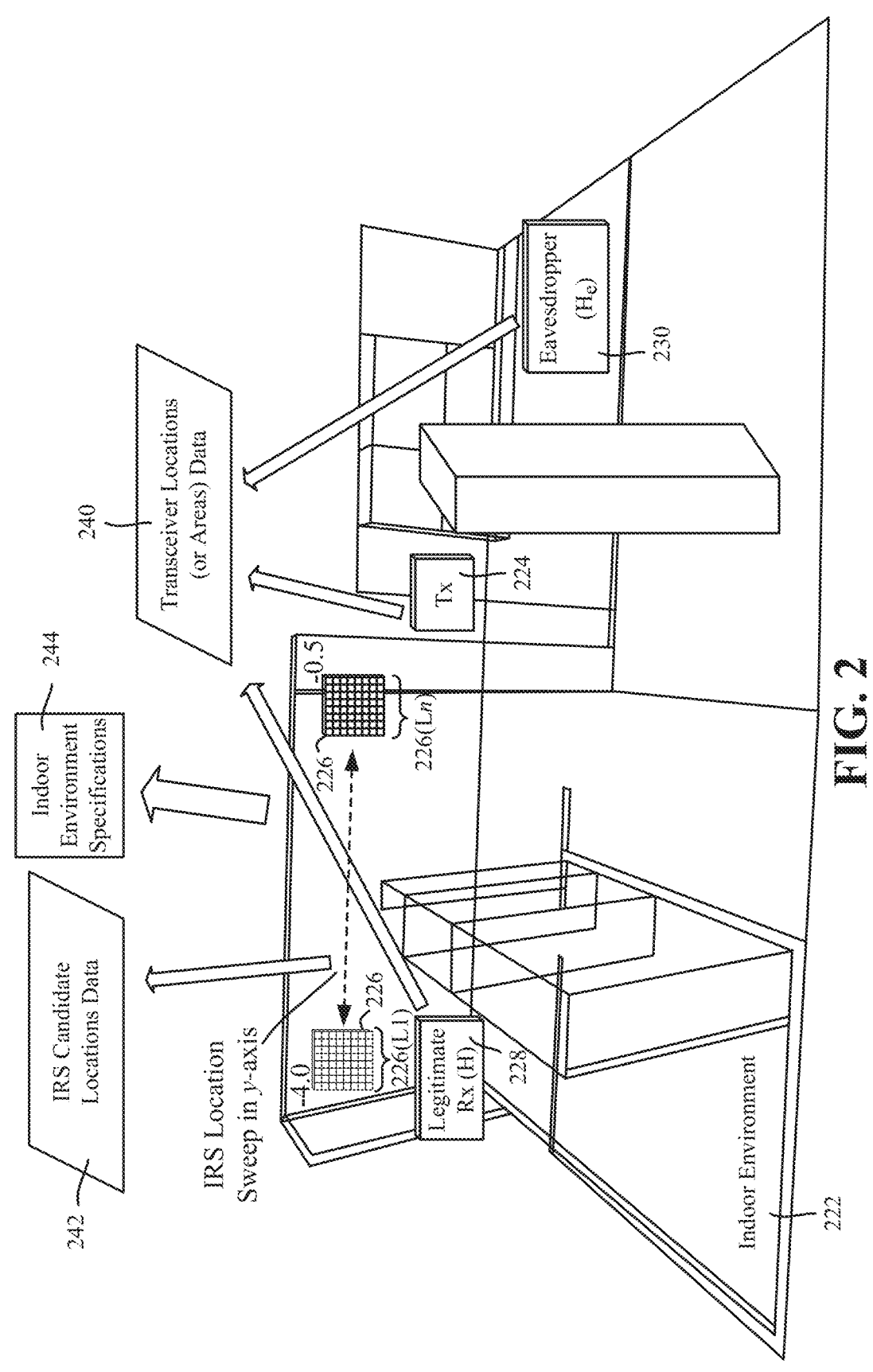
FIG. 2 is a three-dimensional representation of an environment in which the location of an intelligent reflecting surface is determined to redirect communication signals from a transmitter to a receiver with high secrecy capacity, in accordance with various aspects and implementations of the subject disclosure.

FIG. 2 is a representation of an example three-dimensional environment 222 in which a transmitter 224 communicates line-of sight signals to an intelligent reflective surface (IRS) 226. For an indoor scenario, due to the high path loss and blockages due to obstacles, there is often a very weak, or no, line-of-sight communication link between the legitimate Rx or the eavesdropper and the Tx.

In this example, the intelligent reflective surface 226 can be located at various candidate locations (block 242), namely anywhere (in discrete steps) on the dashed line between one outermost boundary candidate location 226 (L1) (−4.0 meters on the y-axis) and another outermost boundary candidate location 226(Ln) (−0.5 meters on the y-axis). Where to mount or otherwise fix the location along the y-axis of the intelligent reflective surface 226 based on secrecy capacity is described herein with reference to this example. Note that the x- and z-coordinates are fixed in this example, although in other scenarios the x- and/or z-coordinates can also be considered (to the extent such positioning is practical within an environment) when locating an intelligent reflective surface.

In the example of FIG. 2, as represented via block 240, the legitimate receiver 228 (H in the equations) and the eavesdropper receiver 230 (H$_e$ in the equations) each can have a location (or an area) that is non-line-of sight with respect to the transmitter 224 but is line-of sight with respect to any of the candidate locations of the intelligent reflective surface 226. As such, determining where to place the intelligent reflective surface 226, in this example somewhere on the on the y-axis, is significant in obtaining a desired level of secrecy capacity from the perspective of the legitimate receiver 228.

Consider that in such an IRS-assisted system, the transmitter (Tx) 224 transmits signal s with power P$_{Tx}$ to the IRS 226, and (if present) the IRS controller 120 (FIG. 1) adjusts phase shifts of each reflecting element and help reflecting the signal to the legitimate receiver (Rx) 228. The transmitter (Tx) 224 is equipped with N$_t$ antennas, the legitimate receiver (Rx) 228 and eavesdropper 230 are each equipped with N$_r$ antennas, and the IRS 226 is equipped with M phase shifting reflecting elements. The IRS (even if static rather than dynamic) will, based on its location, adjust the direction and phase shift of the reflected wave. Given the transmit signal s, received signals at the legitimate Rx and eavesdropper are:

$$y = \omega_l^H H \Phi Gfs + n \qquad (1)$$

$$y_e = \omega_e^H H_e \Phi Gfs + n$$

where $G \in \mathbb{R}^{M \times N_{TX}}$, $H \in \mathbb{R}^{N_{RX} \times M}$, $H_e \in \mathbb{R}^{N_{Rx} \times M}$ represents the channels between IRS-Tx, IRS-legitimate Rx, and IRS-eavesdropper, respectively. The beamforming vector at the receiver side is defined as $\omega_i \in \mathbb{R}^{N_{Rx} \times 1}$, where $i \in \{l, e\}$ denotes the legitimate Rx and eavesdropper, respectively. The phase shift matrix of IRS is defined as $\Phi = \mathrm{diag}(e^{j\Theta_1}, e^{j\Theta_2}, e^{j\Theta_M})$, where diag(•) represents a diagonal matrix with the given diagonal values, $\theta_i$s are the phase shift angles for $i \in [1, M]$, and M is the total number of reflecting elements.

There are various alternatives to determining where to locate the IRS, including manually moving the IRS while measuring the signals at the receiver until an optimal IRS position is determined. Simulations are more practical in many scenarios, such as when designing or retrofitting a room. Various ways to perform simulations are feasible, and thus the technology described herein is not limited to any one way. For simulations, the indoor environment specification data (block 244) is known, e.g., where any windows, walls and other obstacles are located, the type and characteristics of the materials of which such walls and obstacles are made, and so on.

In one implementation, a ray-tracing model to describe the signal propagation on the IRS can be implemented. For simulations, an IRS is considered without including the channel noise effects. That is, the simulation is based on an ideal model for the IRS, as there are different ways to model the IRS, and the simulation considers that the IRS does not add any additional noise while reflecting the signal.

The effect of IRS placement on secrecy capacity for indoor scenarios is thus considered and optimized herein. Secrecy capacity is defined as:

$$C = \max\left\{ \log\left( \frac{1 + \frac{1}{\sigma^2}|\omega_l^H H \Phi Gf|^2}{1 + \frac{1}{\sigma^2}|\omega_e^H H_e \Phi Gf|^2} \right), 0 \right\} \qquad (2)$$

where max{•,•} returns the larger input. In order to keep the comparisons fair, the present technology operates to maximize the secrecy capacity given in Equation (2). C' is defined as follows:

$$C' = \log\left( \frac{1 + \frac{1}{\sigma^2}|\omega_l^H H \Phi Gf|^2}{1 + \frac{1}{\sigma^2}|\omega_e^H H_e \Phi Gf|^2} \right) \qquad (3)$$

and the present systems and methods operate to optimize C'. The optimization can be formulated as:

$$\mathcal{P} : \underset{\omega_l, f, \Phi}{\mathrm{maximize}} C' \qquad (4)$$

$$\text{subject to } |f|^2 < P_{Tx}$$

$$|\omega_l| < 1$$

$$\Phi = \mathrm{diag}(e^{j\theta_1}, \ldots, e^{j\theta_M})$$

It can be readily appreciated that changing the optimization by $\theta_i$ for $i \in [1,M]$ instead of $\Phi$, helps to eliminate one of the constraints, because $\Phi$ can be described by $\theta=\{\theta_i\}$ for $i \in [1, M]$, which does not have any constraints. Therefore, the optimization can be formulated as:

$$\mathcal{P} : \underset{\omega_l, f, \Phi}{\text{maximize}} C' \tag{5}$$

$$\text{subject to } |f|^2 < P_{Tx} \text{ and } |\omega_l| < 1 \text{ when } \Phi = \text{diag}\left(e^{j\theta_1}, \ldots, e^{j\theta_M}\right)$$

Because the secrecy capacity is convex for f, $\omega_l$ and $\Phi$, when the other parameters are fixed and there are constraints provided by $P_{TX}$, one example embodiment applies projected gradient descent as an optimization algorithm. This is an iterative optimization process that uses gradients to update parameters while enforcing the constraints. To enforce the constraints on f and $\omega_l$, the present systems and methods normalize their norm after every gradient step update. Further, in one example implementation, the technology described herein does not optimize the secrecy capacity with respect to $\omega_e$, because the direction of the eavesdropper's beam is not in control of the present system, and it is appreciated that optimizing the secrecy capacity with respect to $\omega_e$ does not help to improve the secrecy. Some embodiments can assume that the direction is towards $H_e$ channel matrix's largest singular value because this is the optimal direction if other factors such as secrecy capacity optimization and IRS are not considered in this problem.

Figure 3:
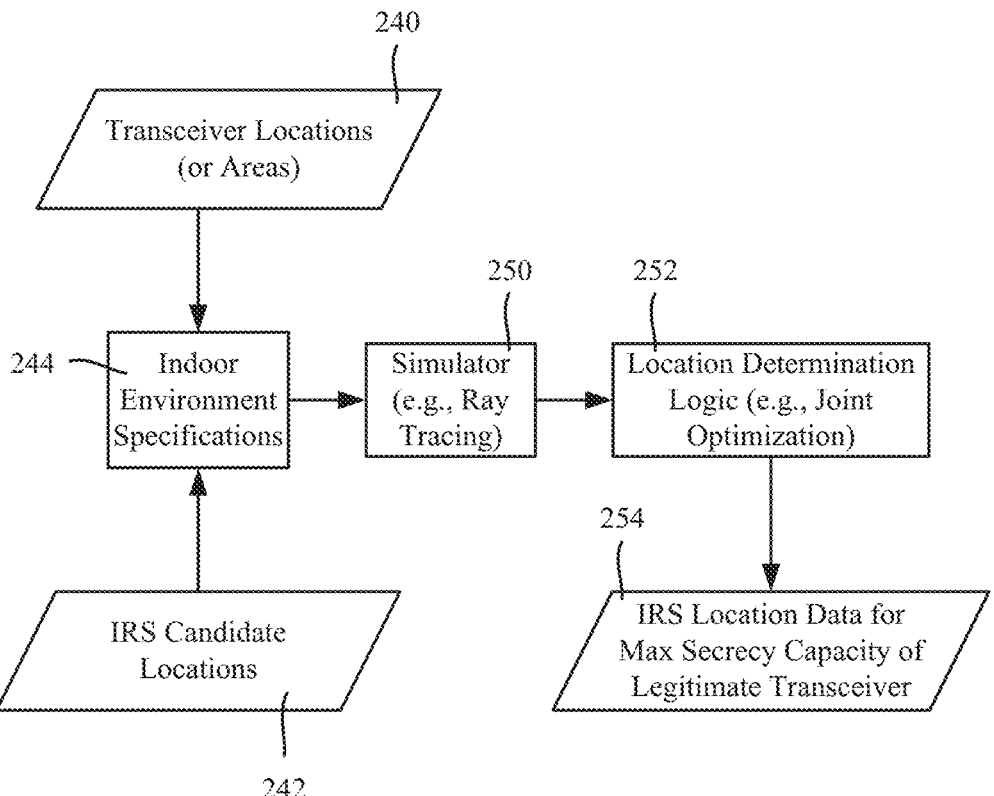
FIG. 3 is a block diagram showing example data and components that can be used to determine an optimal location of an intelligent reflecting surface, in accordance with various aspects and implementations of the subject disclosure.

FIG. 3 summarizes the above, where the various known data (including the transceiver locations/areas 240, the IRS candidate locations 242 and the indoor environment specifications 244) are input data to a simulator (block 350). Location determination logic (block 252, e.g., implementing the joint optimization described herein) provides the IRS location data (block 254) that maximizes the secrecy capacity at the legitimate receiver location (or area). The technology described herein thus operates to optimize the secrecy capacity of a communication link to ensure that the signals are protected against eavesdropping attacks. This involves considering the impact of the IRS, including varying IRS indoor placement, on the communication performance and the security vulnerabilities that can arise from the use of the IRS.

One example implementation includes channel matrix calculation and the optimization defined in equation (5). Channel matrix calculation can be accomplished by using defined toolboxes for antenna and path-loss definition. Gradient descent implementation is also defined in existing technologies. Modeling a room to take the effect of furniture and walls into consideration can be accomplished by using a ray tracing propagation model/toolbox, which provides the behavior that can be observed starting from the point of transmission as electromagnetic radiation travels through the surrounding environment. The path loss of every link due to reflection, diffraction, and scattering can be deduced. There are some controllable parameters such as the maximum number of reflections, which can be taken as zero if only considering the reflection via IRS, with typical surface material, e.g., wood. Antenna parameters can be modeled so that by using the calculated antennas and path loss, the channel coefficients are calculated by using the LOS channel model.

With respect to implementation of projected gradient descent, this part is directed to solving the optimization problem in equation (5). First, the channel matrix, which is calculated as described herein, is exported. Then, Tx and legitimate Rx beamforming vectors and IRS phase shifter matrices are initialized. The loss function is 'C'' as defined in equation (3). Then the gradient descent is applied to calculate Tx and legitimate Rx beamforming vectors, f and l, and the IRS phase shifter matrix, $\Phi$. After every gradient step, the conditions off and l are controlled. If the matrix norm is out of the region defined, then it is projected back to the region. During this optimization, the Adam optimizer is used. The results of every optimization with different parameters are calculated by using an optimum learning rate, which can be calculated experimentally. The learning rate can be decreased by a scheduler.

In one implementation, the channel matrices and beamforming/phase shifter matrices are defined as complex numbers. To use with existing tools, separate functions can be used to complex-valued matrices into complex-valued tensors. Additionally, the multiplication of two complex tensors can be overwritten.

As described via the equations above and also with reference to FIGS. 4-7, the technology described herein is further analyzed with respect to comparing convergence performance for 28 GHz and sub-6 GHz links, and with respect to demonstrating a significant reduction in compute time. The secrecy capacity of an IRS-assisted indoor transmission at 28 GHz varies for different indoor IRS placement locations. The technology described herein is also analyzed comparing convergence performance for 28 GHz and sub-6 GHz links and demonstrating significant reduction in compute time.

More particularly, the following table shows example simulation parameters in one implementation:

| Parameter | Values |
|---|---|
| Transmit Power, $P_{Tx}$ | 26 dBm |
| Noise Figure | 6 dBm |
| Center frequency, $f_c$ | 28 GHz |
| Symbol duration, $T_{dur}$ | $8.92 \times 10^{-6}$ |
| Number of Tx antennas, $N_{Tx}$ | 64 |
| Number of Rx antennas, $N_{Rx}$ | 16 |
| Number of reflecting elements, M | 20 |

The secrecy capacity was numerically evaluated for the indoor model shown in FIG. 2 using the parameters given in Table 1. A commercially available ray-tracer toolbox was used to calculate path-loss according to the location and the room specifications, and then channel matrices in the environment were calculated. The secrecy capacity is obtained from Equation (3), as it is appreciated that the projected gradient descent method benefits from this equation instead of Equation (2). Before optimizing the secrecy capacity for different scenarios, the optimal learning rate can be predetermined by an exhaustive search. The optimization can take up to $10^6$ iterations in one implementation, however, if the secrecy capacity change (e.g., between consecutive iterations) is lower than a threshold secrecy capacity change value (e.g., $10^{-6}$) within some reasonable number of (e.g., 100) iterations, the simulation described herein accepts this as a convergence.

Figure 4:
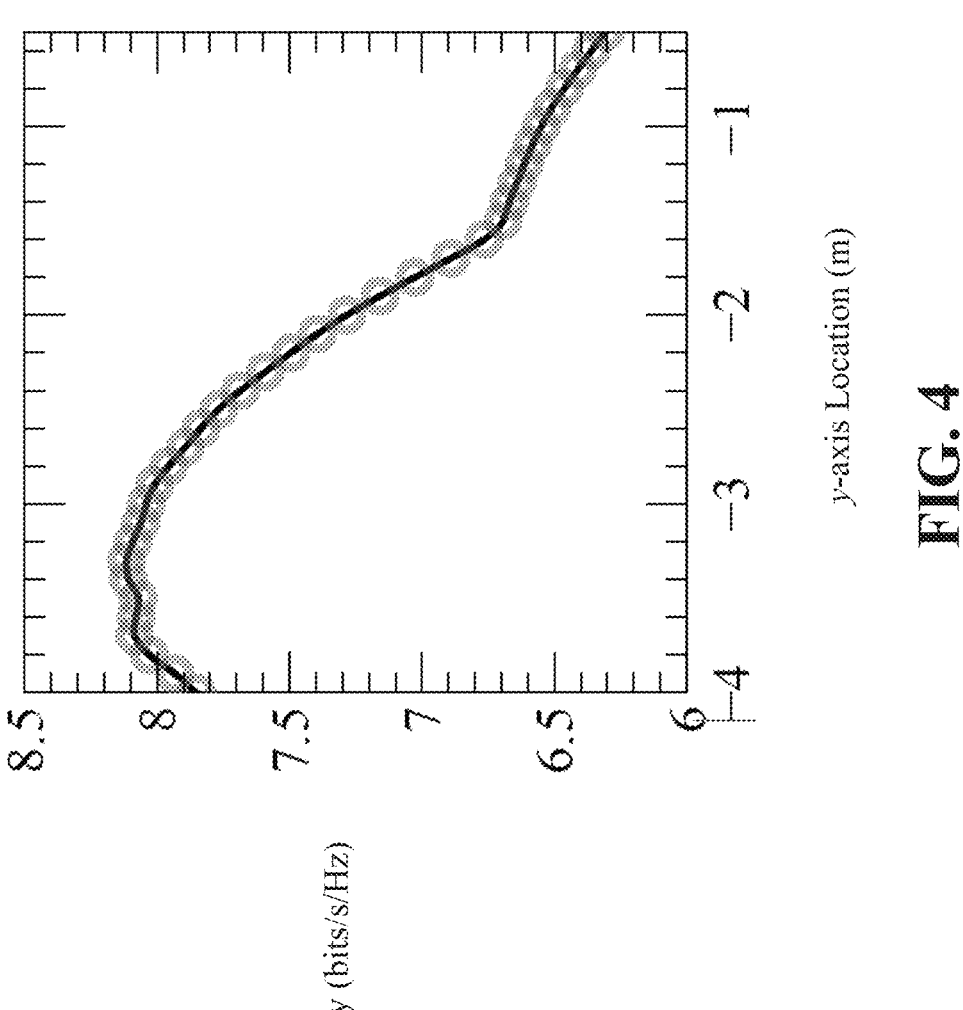
FIG. 4 is an example graphical representation of the effect of IRS location change in the y-axis on secrecy capacity, in accordance with various aspects and implementations of the subject disclosure.

FIG. 4 is an example graphical representation that illustrates the effect of IRS y-axis location change on secrecy capacity for M=20, $f_c$=28 GHz, $P_{TX}$=26 dBm and (x, z)=(−3.05,1.5). As can be seen, in this particular environment the most optimal IRS y-axis location is around 3.34 meters. When the location in y-axis approaches −3.5, the IRS's distance with the legitimate receiver decreases while the distance with the eavesdropper increases, whereby the secrecy capacity increases by more than 1 bits/s/Hz. This is a practical solution for complicated floor plans because in various embodiments, the location of the IRS can be optimized according to the secrecy capacity.

Figure 5:
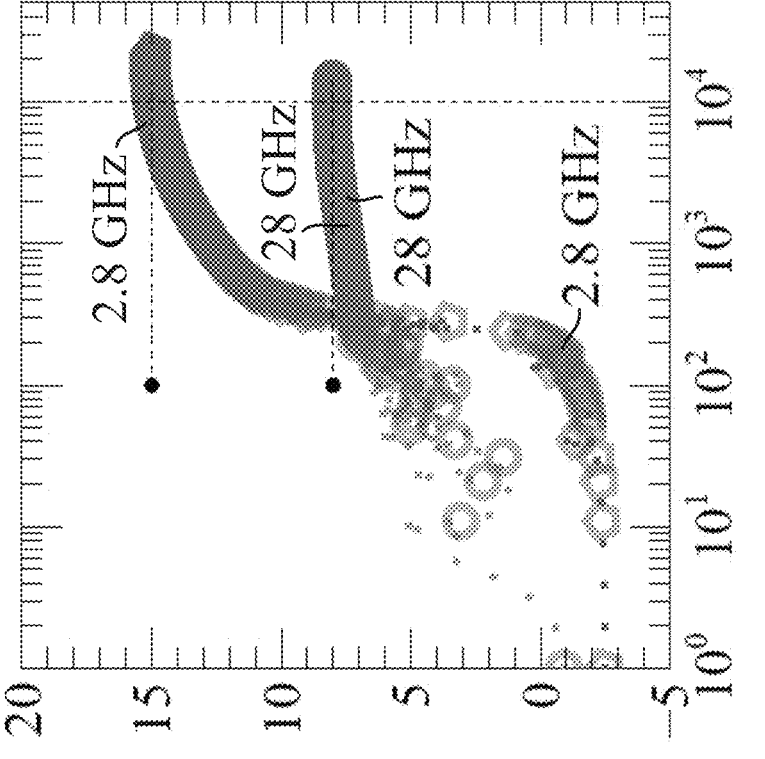
FIG. 5 is an example graphical representation of the effect of carrier frequency on secrecy capacity for a fixed IRS location, in accordance with various aspects and implementations of the subject disclosure.

FIG. 5 shows the analysis of the effect of carrier frequency, $f_c$ on the secrecy capacity when the location of the IRS is fixed, (x, y, z)=(−3.05, −3.0, 1.5), and $P_{TX}$=26 dBm for f=2.8 GHz and 28 GHz. It is appreciated that at $f_c$=2.8 GHz, the secrecy capacity is improved by a factor of two because the path loss at lower frequencies is far lesser than the high path loss at mmWave frequencies. However, this leads to a much longer convergence time as shown via the number of iterations. At $f_c$=28 GHz, the convergence duration reduces by at least a factor of three.

Figure 6:
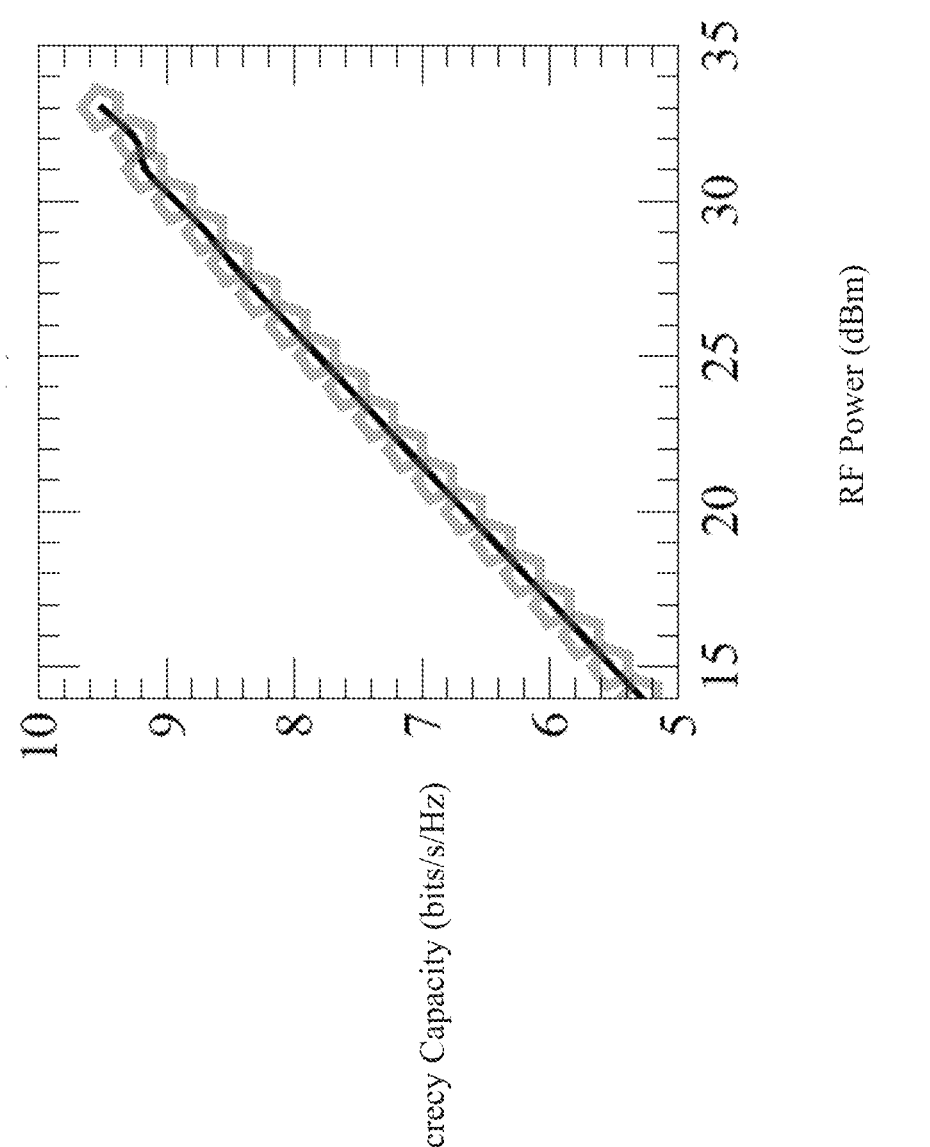
FIG. 6 is an example graphical representation of the effect of RF power on secrecy capacity, in accordance with various aspects and implementations of the subject disclosure.

FIG. 6 shows the effect of RF power on the secrecy capacity for a fixed IRS location (x, y, z)=(— 3.05, −3.0, 1.5). Secrecy capacity increases with RF power; indeed, the increase in RF power increases the secrecy capacity generally linearly. However, a given hardware implementation can pose challenges if active components are required to boost the power. Active components add distortion and compression, which may lead to a drift in the secrecy capacity with increasing power.

Figure 7:
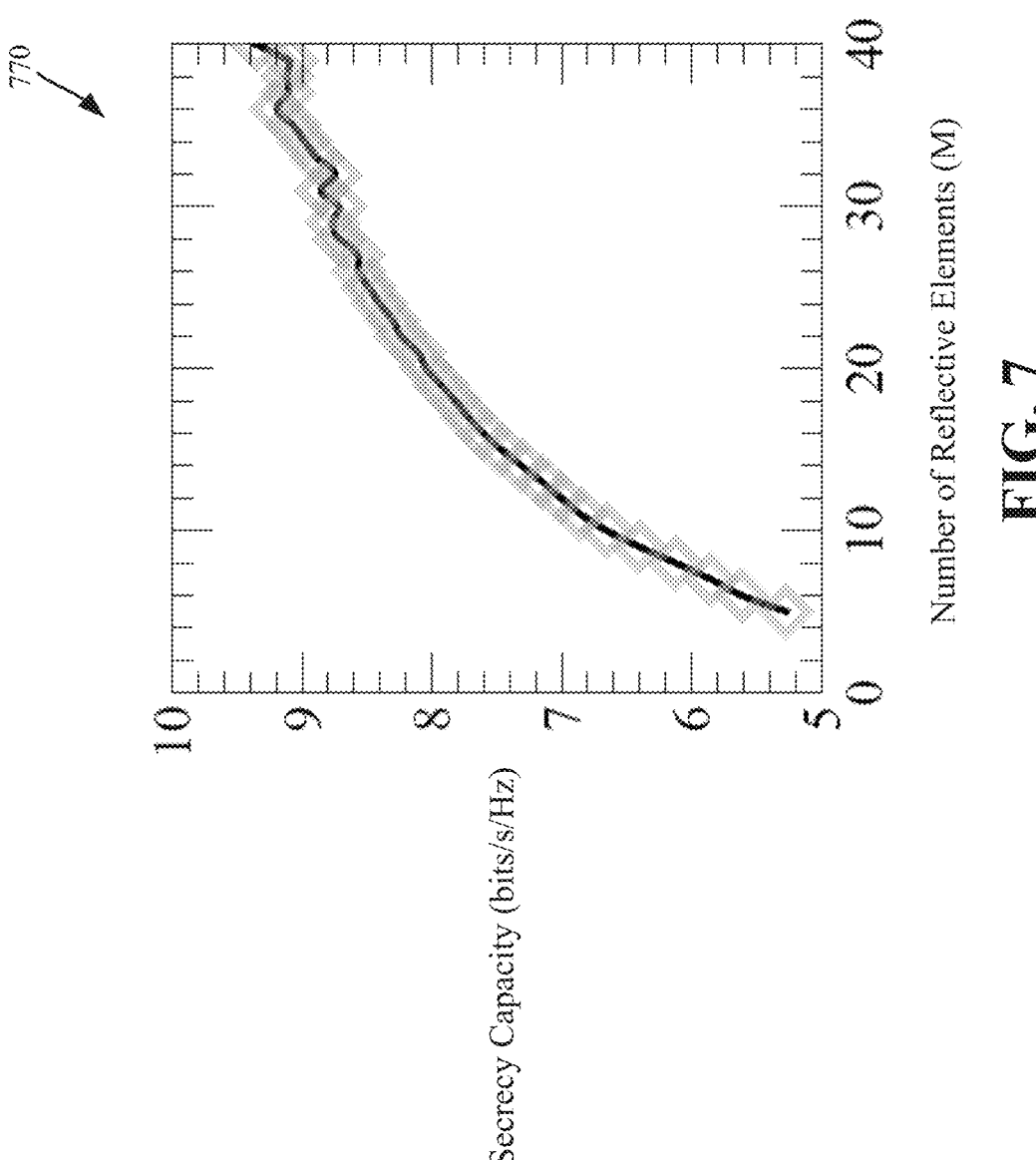
FIG. 7 is an example graphical representation of how the number of reflective elements in an IRS impacts the secrecy capacity, in accordance with various aspects and implementations of the subject disclosure.

The number of reflective elements M in the IRS also impacts the secrecy capacity as illustrated in FIG. 7. Indeed, increasing the number of IRS reflecting elements is more effective than increasing the number of antennas, and at the same time is also cost-efficient. As seen in this example environment and set of parameters, secrecy capacity increases more than 1.8 times by increasing the number of IRS reflecting elements M from 4 to 40. Note however that increasing M further provides a limited increase in the secrecy capacity, as it starts to saturate after approximately a ten times increase in M. Changing the $P_{TX}$ from 26 dBm to 31 dBm can have the same effect on secrecy capacity improvement as that of with changing M from 20 to 36, for example. Notwithstanding, because having higher transmit powers in indoor environments can be generally unsafe, increasing the number of reflecting elements is an attractive option to decrease (or select) the transmit power to an appropriately safe level while still achieving high secrecy capacity.

Figure 8:
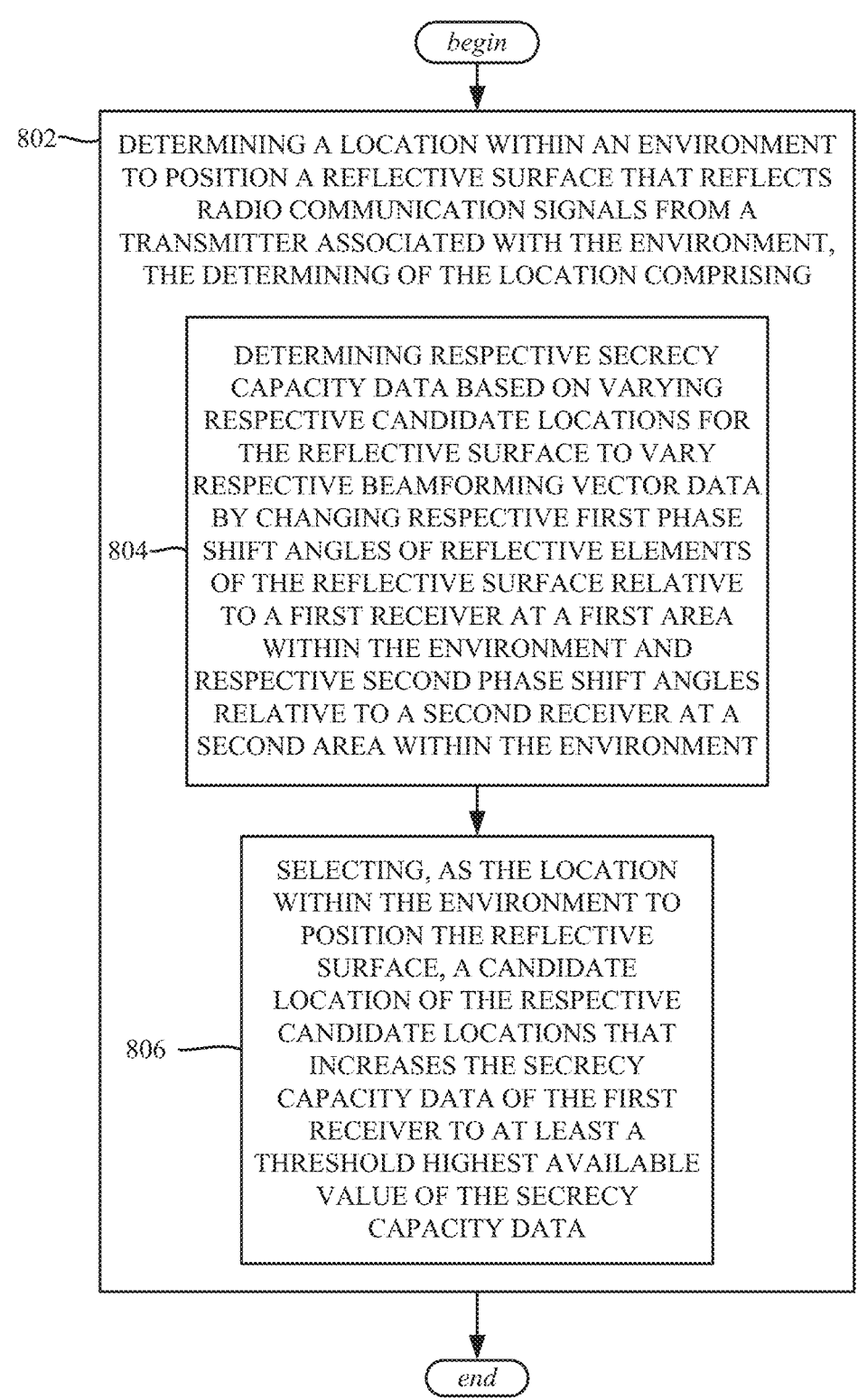
FIG. 8 is a flow diagram showing example operations related to determining a location within an environment to position a reflective surface, in accordance with various aspects and implementations of the subject disclosure.

One or more embodiments can be embodied in a system, such as represented in the example operations of FIG. 8, and for example can include a memory that stores computer executable components and/or operations, and a processor that executes computer executable components and/or operations stored in the memory. Example operations can include operation 802, which represents determining a location within an environment to position a reflective surface that reflects radio communication signals from a transmitter associated with the environment. The determining of the location can include example operations 804 and 806. Example operation 804 represents determining respective secrecy capacity data based on varying respective candidate locations for the reflective surface to vary respective beamforming vector data by changing respective first phase shift angles of reflective elements of the reflective surface relative to a first receiver at a first area within the environment and respective second phase shift angles relative to a second receiver at a second area within the environment. Example operation 806 represents selecting, as the location within the environment to position the reflective surface, a candidate location of the respective candidate locations that increases the secrecy capacity data of the first receiver to at least a threshold highest available value of the secrecy capacity data.

The beamforming vector data can include a receiver beamforming vector.

Determining the respective secrecy capacity data can include performing projected gradient descent (or similar optimization techniques) to iteratively optimize respective variable data via respective gradient steps based on the respective locations subject to at least one of: beamforming vector-based constraint data, transmission frequency-based constraint data, or phase-shift-based constraint data.

Further operations can include enforcing the constraint data, which can include at least one of: normalizing respective frequency norm data after the respective gradient steps, or normalizing respective beamforming norm data after the respective gradient steps.

Further operations can include ending the performing of the projected gradient descent in response to secrecy capacity change data between gradient steps being determined to satisfy a function of a secrecy capacity change data threshold.

Further operations can include determining a learning rate to iteratively optimize the respective variable data.

Performing the projected gradient descent can include fixing signal-related parameter data, and wherein the signal-related parameter data can include at least one of: transmit power data, noise data, center frequency data, or symbol duration data.

Performing the projected gradient descent can include fixing receiving-related parameter data, the receiving-related parameter data comprising at least one of: a transmitter antenna number corresponding to antennas of the transmitter, a receiver antenna number corresponding to antennas of the first receiver, or a reflecting elements number corresponding to a number of the reflecting elements.

Determining the location further can include determining respective path loss data for the respective candidate locations.

Determining the respective path loss data can include using ray-tracing (or similar evaluation techniques) to compute the respective path loss data for the respective candidate locations based on specification data of the environment.

Further operations can include determining channel matrices data in the environment based on transmission antennas of the transmitter and receiver antennas of the first receiver.

Further operations can include determining a number of the reflective elements to enhance the secrecy capacity data.

Further operations can include determining a transmission power of the transmitter to modify the secrecy capacity data.

Further operations can include controlling the phase shift data of at least one reflective element.

One or more example embodiments, such as corresponding to example operations of a method, are represented in FIG. 9. Example operation 902 represents determining, by a system comprising a processor, respective secrecy capacity values associated with a first receiver in a first area of an environment relative to a second receiver in a second area of the environment, the respective secrecy capacity values having been determined based on a transmitter location and varying respective phase shift data of an intelligent reflecting surface corresponding to different candidate locations for the intelligent reflecting surface in the environment. Example operation 904 represents selecting, by the system based on the respective secrecy capacity values, a location from among the different candidate locations to position the intelligent reflecting surface.

Determining the respective secrecy capacity values can include performing projected gradient descent to iteratively optimize respective variable data, corresponding to the varying of the respective phase shift data, until convergence is determined; convergence can be based on a change value of the secrecy capacity value between consecutive iterations being determined to have satisfied a criterion specified with respect to a secrecy capacity change value threshold.

Determining the location further can include using ray-tracing (or similar evaluation techniques) to compute/simulate respective path loss data for the different candidate locations based on specification data of the environment, and determining channel matrices in the environment based on transmission antennas of the transmitter and receiver antennas of the first receiver.

FIG. 10 summarizes various example operations, e.g., corresponding to a machine-readable medium, including executable instructions that, when executed by a processor, facilitate performance of operations. Example operation 1002 represents obtaining respective path loss data for respective candidate locations applicable to a positioning of an intelligent reflecting surface in an environment, the environment comprising a transmitter, a first receiver at a first area and a second receiver at a second area different from the first area. Example operation 1004 represents obtaining channel matrices data in the environment based on transmitter antennas of the transmitter and receiver antennas of the first receiver. Example operation 1006 represents determining respective secrecy capacity values corresponding to the respective candidate locations, and the first receiver at the first area relative to the second receiver at the second area. Example operation 1008 represents determining a location for the positioning of the intelligent reflecting surface based on which of the respective candidate locations corresponds to a highest secrecy capacity value of the respective secrecy capacity values.

Determining the respective secrecy capacity values can include performing projected gradient descent to iteratively update parameter data corresponding to the respective candidate locations until convergence to an estimated secrecy capacity value is obtained.

Obtaining the respective path loss data can include performing ray tracing based on the environment.

As can be seen, the technology described herein facilitates determining an optimal placement of an intelligent reflective surface (as a beamforming media) to maximize secrecy capacity with respect to a legitimate receiver in scenarios in which an eavesdropper may be present. A tile-allocation-and-phase-shift-adjustment strategy for the IRS are considered in optimizing the secrecy capacity. While the intelligent reflective surface is particularly valuable with respect to reflecting mmWave signals, systems in other frequency bands including C band systems also can benefit from the technology described herein.

Along with an alignment strategy, the optimal placement to achieve the maximum secrecy capacity is evaluated through ray-tracing simulation. Results demonstrate that the technology described herein can significantly improve the secrecy capacity performance for an indoor media commutation network. Utilizing IRS, a notable improvement in the secrecy capacity is achieved. The location of the IRS is thus an effective parameter to increase the secrecy capacity.

As shown herein, the benefits of an IRS in terms of improving wireless communication security have been quantified based on the theories on physical layer security. Indeed, physical layer security can guarantee security of communication contents from an information-theoretic point of view, as it is mainly based on advanced signal processing to manipulate the air interface in wireless communications, and does not require encryption or decryption with keys. Thus, the generally low complexity technology described herein can, for example, be used to distribute private keys during a network initialization stage.

The low-complexity property of physical layer security is synergistic with the low-complexity hardware of IRS, making their integration as suitable technique for obtaining a certain level of secrecy in numerous low-complexity or dynamic wireless networks (e.g., IoT, vehicular networks). In addition, their integration is also desirable in various URLLC application scenarios, as their low complexities do not cost much signal processing time and thus can help reduce communication latency.

IRS offers many benefits while being fully passive to improve the radio coverage indoors and outdoors. The technology described herein helps in reducing deployment/installation time, location accuracy, beam alignment and decisions on where the actual surface can be placed (height, location, etc.), including the mounting method, each of which previously have been a challenge. The optimization algorithm can accurately determine a position of the IRS that provides the maximum SNR. This facilitates efficient deployment, by quickly finding the optimal spot for the IRS placement and installation, thus reducing engineering time and effort while providing desired secrecy capacity performance.

Figure 11:
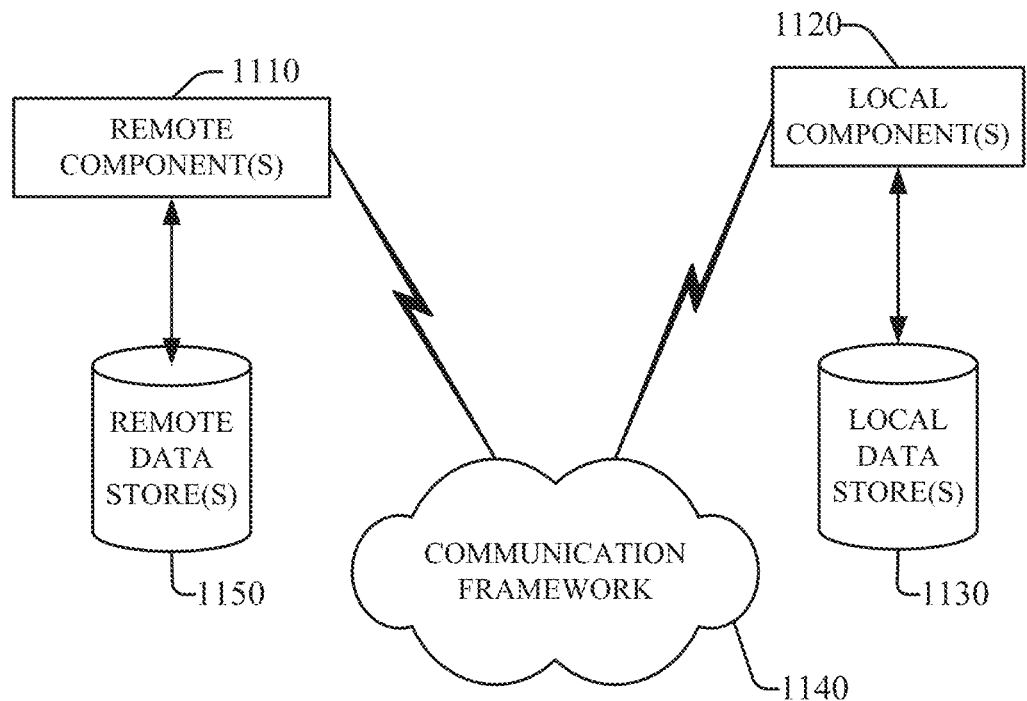
FIG. 11 is a block diagram representing an example computing environment into which aspects of the subject matter described herein may be incorporated.

FIG. 11 is a schematic block diagram of a computing environment 1100 with which the disclosed subject matter can interact. The system 1100 comprises one or more remote component(s) 1110. The remote component(s) 1110 can be hardware and/or software (e.g., threads, processes, computing devices). In some embodiments, remote component(s) 1110 can be a distributed computer system, connected to a local automatic scaling component and/or programs that use the resources of a distributed computer system, via communication framework 1140. Communication framework 1140 can comprise wired network devices, wireless network devices, mobile devices, wearable devices, radio access network devices, gateway devices, femtocell devices, servers, etc.

The system 1100 also comprises one or more local component(s) 1120. The local component(s) 1120 can be hardware and/or software (e.g., threads, processes, computing devices). In some embodiments, local component(s) 1120 can comprise an automatic scaling component and/or programs that communicate/use the remote resources 1110, etc., connected to a remotely located distributed computing system via communication framework 1140.

One possible communication between a remote component(s) 1110 and a local component(s) 1120 can be in the form of a data packet adapted to be transmitted between two or more computer processes. Another possible communication between a remote component(s) 1110 and a local component(s) 1120 can be in the form of circuit-switched data adapted to be transmitted between two or more computer processes in radio time slots. The system 1100 comprises a communication framework 1140 that can be employed to facilitate communications between the remote component(s) 1110 and the local component(s) 1120, and can comprise an air interface, e.g., Uu interface of a UMTS network, via a long-term evolution (LTE) network, etc. Remote component(s) 1110 can be operably connected to one or more remote data store(s) 1150, such as a hard drive, solid state drive, SIM card, device memory, etc., that can be employed to store information on the remote component(s)

1110 side of communication framework 1140. Similarly, local component(s) 1120 can be operably connected to one or more local data store(s) 1130, that can be employed to store information on the local component(s) 1120 side of communication framework 1140.

Figure 12:
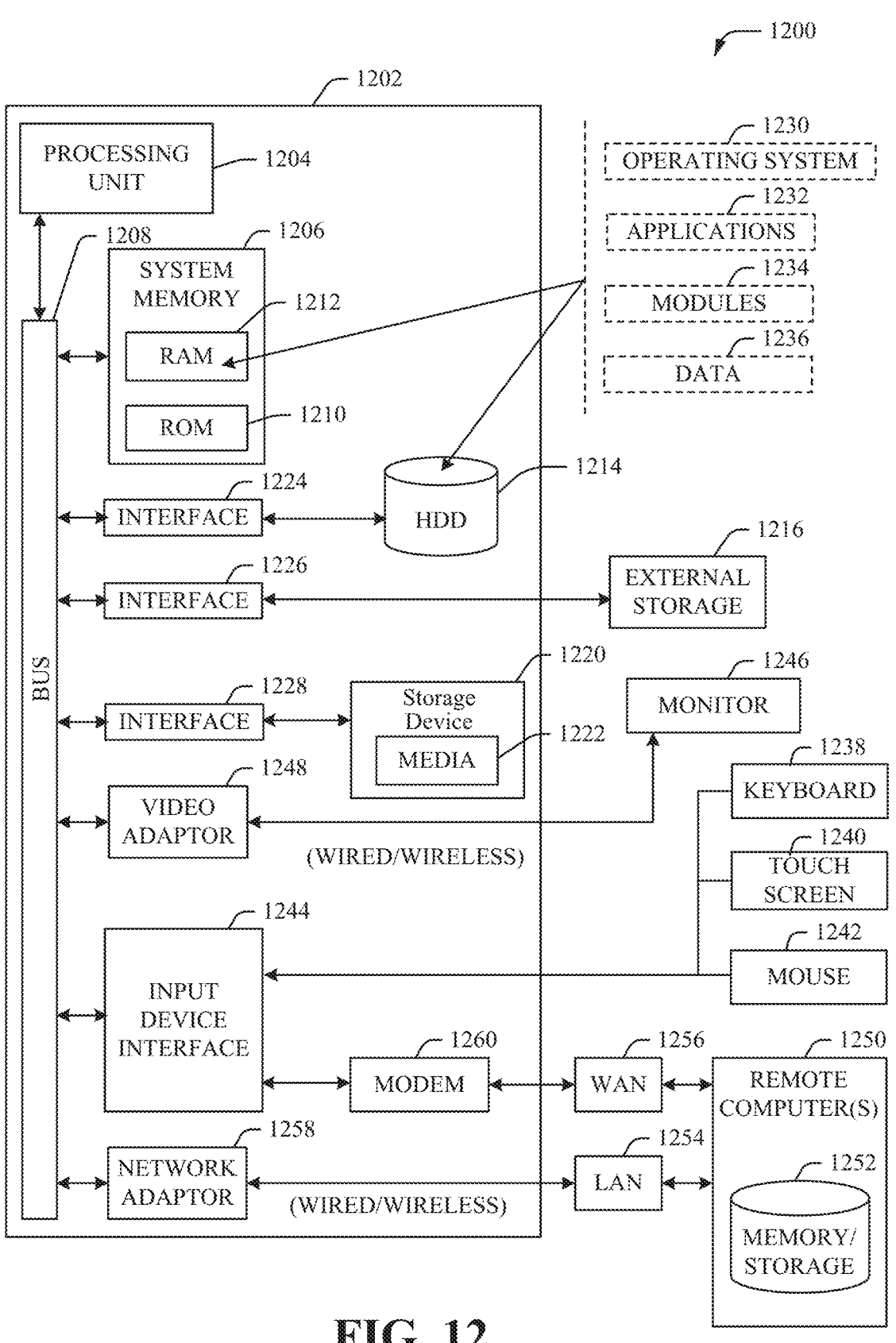
FIG. 12 depicts an example schematic block diagram of a computing environment with which the disclosed subject matter can interact/be implemented at least in part, in accordance with various aspects and implementations of the subject disclosure.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), and can include one or more external storage devices 1216 (e.g., a magnetic floppy disk drive (FDD) 1216, a memory stick or flash drive reader, a memory card reader, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214.

Other internal or external storage can include at least one other storage device 1220 with storage media 1222 (e.g., a solid state storage device, a nonvolatile memory device, and/or an optical disk drive that can read or write from removable media such as a CD-ROM disc, a DVD, a BD, etc.). The external storage 1216 can be facilitated by a network virtual machine. The HDD 1214, external storage device(s) 1216 and storage device (e.g., drive) 1220 can be connected to the system bus 1208 by an HDD interface 1224, an external storage interface 1226 and a drive interface 1228, respectively.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1294 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are examples and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be distributed across a plurality of devices. Accordingly, the various embodiments are not to be limited to any single implementation, but rather are to be construed in terms of their breadth, spirit and scope in accordance with the appended claims.

What is claimed is:

1. A system, comprising:
   at least one processor; and
   at least one memory that stores executable instructions that, when executed by the at least one processor, facilitate performance of operations, the operations comprising:
      determining a location within an environment to position a reflective surface that reflects radio communication signals from a transmitter associated with the environment, the determining of the location comprising:
         determining respective secrecy capacity data based on varying respective candidate locations for the reflective surface to vary respective beamforming vector data by changing respective first phase shift angles of reflective elements of the reflective surface relative to a first receiver at a first area within the environment and respective second phase shift angles relative to a second receiver at a second area within the environment; and
         selecting, as the location within the environment to position the reflective surface, a candidate location of the respective candidate locations that increases the secrecy capacity data of the first receiver to at least a threshold highest available value of the secrecy capacity data.

2. The system of claim 1, wherein the beamforming vector data comprises a receiver beamforming vector.

3. The system of claim 1, wherein the determining of the respective secrecy capacity data comprises performing projected gradient descent to iteratively optimize respective variable data via respective gradient steps based on the respective locations subject to at least one of: beamforming vector-based constraint data, transmission frequency-based constraint data, or phase-shift-based constraint data.

4. The system of claim 3, wherein the operations further comprise enforcing the constraint data, comprising at least one of: normalizing respective frequency norm data after the respective gradient steps, or normalizing respective beamforming norm data after the respective gradient steps.

5. The system of claim 3, wherein the operations further comprise ending the performing of the projected gradient descent in response to secrecy capacity change data between gradient steps being determined to satisfy a function of a secrecy capacity change data threshold.

6. The system of claim 3, wherein the operations further comprise determining a learning rate to iteratively optimize the respective variable data.

7. The system of claim 3, wherein the performing of the projected gradient descent comprises fixing signal-related parameter data, and wherein the signal-related parameter data comprises at least one of: transmit power data, noise data, center frequency data, or symbol duration data.

8. The system of claim 3, wherein the performing of the projected gradient descent comprises fixing receiving-related parameter data, the receiving-related parameter data comprising at least one of: a transmitter antenna number corresponding to antennas of the transmitter, a receiver antenna number corresponding to antennas of the first receiver, or a reflecting elements number corresponding to a number of the reflecting elements.

9. The system of claim 1, wherein the determining of the location further comprises determining respective path loss data for the respective candidate locations.

10. The system of claim 9, wherein the determining of the respective path loss data comprises using ray-tracing to compute the respective path loss data for the respective candidate locations based on specification data of the environment.

11. The system of claim 9, wherein the operations further comprise determining channel matrices data in the environment based on transmission antennas of the transmitter and receiver antennas of the first receiver.

12. The system of claim 1, wherein the operations further comprise determining a number of the reflective elements to modify the secrecy capacity data.

13. The system of claim 1, wherein the operations further comprise determining a transmission power of the transmitter to enhance the secrecy capacity data.

14. The system of claim 1, wherein the operations further comprise controlling the phase shift data of at least one reflective element.

15. A method, comprising:
    determining, by a system comprising a processor, respective secrecy capacity values associated with a first receiver in a first area of an environment relative to a second receiver in a second area of the environment, the respective secrecy capacity values having been determined based on a transmitter location of a transmitter and varying respective phase shift data of an intelligent reflecting surface corresponding to different candidate locations for the intelligent reflecting surface in the environment; and
    selecting, by the system based on the respective secrecy capacity values, a location from among the different candidate locations to position the intelligent reflecting surface, wherein the selecting of the location further comprises using ray-tracing to compute respective path loss data for the different candidate locations based on specification data of the environment, and determining channel matrices in the environment based on transmission antennas of the transmitter and receiver antennas of the first receiver.

16. The method of claim 15, wherein the determining of the respective secrecy capacity values comprises performing projected gradient descent to iteratively optimize respective variable data, corresponding to the varying of the respective phase shift data, until convergence is determined, and wherein the convergence is based on a change value of the secrecy capacity value between consecutive iterations being determined to have satisfied a criterion specified with respect to a secrecy capacity change value threshold.

17. A non-transitory machine-readable medium, comprising executable instructions that, when executed by at least one processor, facilitate performance of operations, the operations comprising:
    obtaining respective path loss data for respective candidate locations applicable to a positioning of an intelligent reflecting surface in an environment, the environment comprising a transmitter, a first receiver at a first area, and a second receiver at a second area different from the first area;
    obtaining channel matrices data in the environment based on transmitter antennas of the transmitter and receiver antennas of the first receiver;
    determining respective secrecy capacity values corresponding to the respective candidate locations, and the first receiver at the first area relative to the second receiver at the second area; and
    determining a location for the positioning of the intelligent reflecting surface based on which of the respective candidate locations corresponds to a highest secrecy capacity value of the respective secrecy capacity values.

18. The non-transitory machine-readable medium of claim 17, wherein the determining of the respective secrecy capacity values comprises performing projected gradient descent to iteratively update parameter data corresponding to the respective candidate locations until convergence to an estimated secrecy capacity value is obtained.

19. The non-transitory machine-readable medium of claim 17, wherein the obtaining of the respective path loss data comprises performing ray tracing based on the environment.

20. The method of claim 16, wherein the performing of the projected gradient descent comprises iteratively optimizing respective variable data via respective gradient steps based on the different candidate locations subject to at least one of: beamforming vector-based constraint data, transmission frequency-based constraint data, or phase-shift-based constraint data.

\* \* \* \* \*